April 5, 1932.　　　L. E. LA BRIE　　　1,852,121

BRAKE

Filed April 19, 1929　　2 Sheets-Sheet 1

INVENTOR.
Ludger E. LaBrie
BY M. W. McConkey
ATTORNEY

INVENTOR.
Ludger E. La Brie
BY
ATTORNEY

Patented Apr. 5, 1932

1,852,121

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed April 19, 1929. Serial No. 356,348.

This invention relates to brakes, and is illustrated as embodied in an internal expanding automobile brake. An object of the invention is to provide a simple and powerful brake, preferably of the type in which the anchorage shifts when the drum reverses its direction of rotation, in order to secure full effectiveness of the friction means.

Various features of novelty relate to a novel anchorage for the brake on a part of the applying mechanism, to an arrangement in which a floating wedge or the like applies the brake in two stages such that the friction means is first shifted bodily against the drum without leaving its anchorage and is thereafter expanded while the drum friction holds one end or the other anchored, and to other novel and desirable features of construction and arrangement which will be apparent from the following description of the illustrative embodiments shown in the accompanying drawings, in which.

Figure 1:
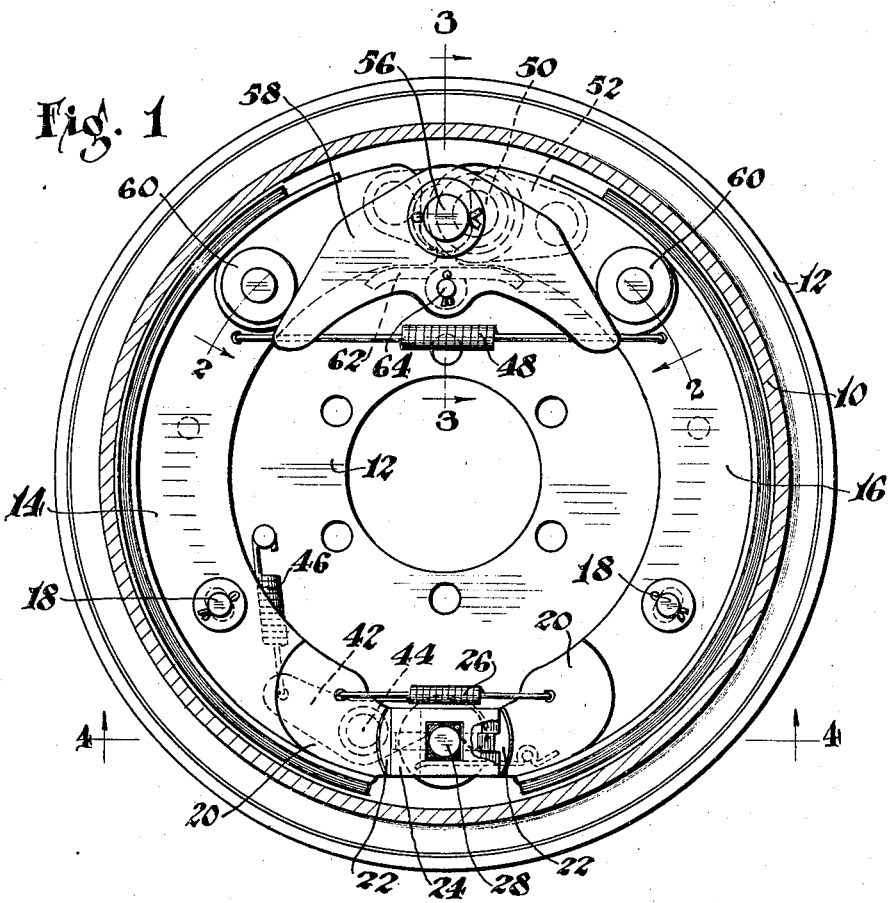
Figure 1 is a vertical section through a brake embodying one form of the invention, just inside the head of the brake drum, and showing the brake shoes in side elevation.
Figures 2, 3:
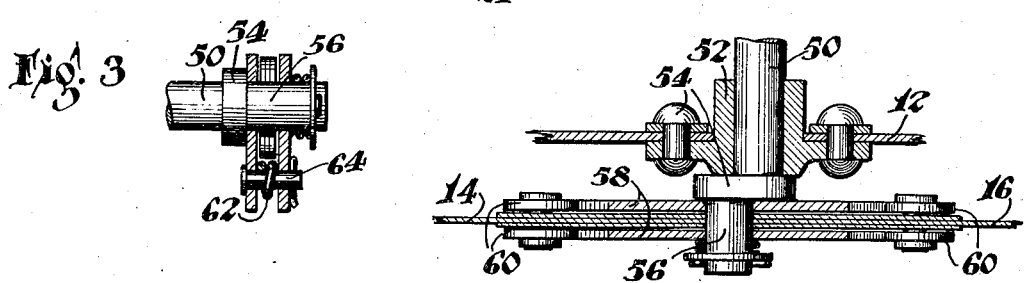
Figure 2 is a partial section through the applying means, on the line 2—2 of Figure 1.
Figure 3 is a partial section on the line 3—3 of Figure 1, radially through the applying means.
Figure 4:
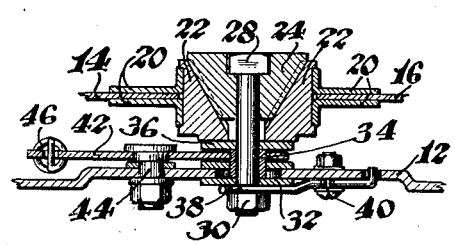
Figure 4 is a partial section through the brake adjustment, on the line 4—4 of Figure 1.

The brake illustrated in Figure 1 includes a rotatable drum 10, at the open side of which is a support such as a backing plate 12, and within which is the friction means of the brake. The friction means preferably includes two unchangeable shoes 14 and 16, provided with suitable steady rests 18, and connected at their lower ends by an adjustable pivot joint shown in detail in Figure 4.

The shoes preferably have outwardly-flanged plates 20 welded to their webs at their ends, to form broadened thrust surfaces or sockets cylindrical in form and pivotally engaging blocks 22 having diverging inner faces keyed to and embracing a central wedge 24. A tensioned spring 26 holds the shoes against the blocks 22. The wedge 24 is operatively engaged by the head of a centrally-arranged bolt 28 having threaded thereon an adjusting nut 30 outside the backing plate and engaging a washer 32 seated against a spacer or sleeve 34 engaging a washer 36 which in turn is seated against the blocks 22. Thus by tightening the nut 30 the shoes are spread apart to adjust the brake for wear. A spring finger 38, held by a bolt 40 and having its end turned at right angles into a hole in the backing plate, acts as a lock to prevent turning of nut 30 except when a wrench is applied.

A wedge lever 42, fulcrumed on a bolt 44 carried by the backing plate, has diverging wedge surfaces from a downwardly opening notch embracing the sleeve 34, and is urged downwardly against the sleeve by means such as a spring 46. This lever serves to center the brake shoe assembly when the brake is released.

The brake is applied, against the resistance of a return spring 48, by means such as a shaft 50 journaled in a bracket 52 riveted to the backing plate, and having a crank arm 54 with an eccentric pin 56 at its end which is moved substantially radially upward in Figure 1 in applying the brake. Mounted on pin 56, for free pivoting thereon, are a pair of double wedge members 58 engaging rollers 60 or the like on the shoes. Members 58 have a leaf spring 62 carried by a cross pin 64, and which engages shoes 14 and 16 in a manner resisting tilting of the wedge members in either direction.

Shoe 14 anchors against the eccentric pin 56 when the drum is turning clockwise, and the shoe 16 anchors against pin 56 when the drum is turning counter-clockwise, the braking torque in either case acting substantially lengthwise on arm 54 so that there is practically no reaction through shaft 50 back to the brake pedal.

In operation, shaft 50 is turned to lift wedge members 58 to apply the brake in two stages, during the first of which stages the shoes 14 and 16 are lifted bodily against the resistance of spring 46 into engagement with the drum. While both of them remain in engagement with anchorage 56, and during the second of which stages the shoes are wedged apart against the resistance of spring 48 to complete the application of the brake while one or the other of the shoes is held anchored by the drum friction. This obviates any shifting of the brake anchorage during or after the application of the brake, which might otherwise cause the brake to take hold with a disagreeable shock.

Figure 5:
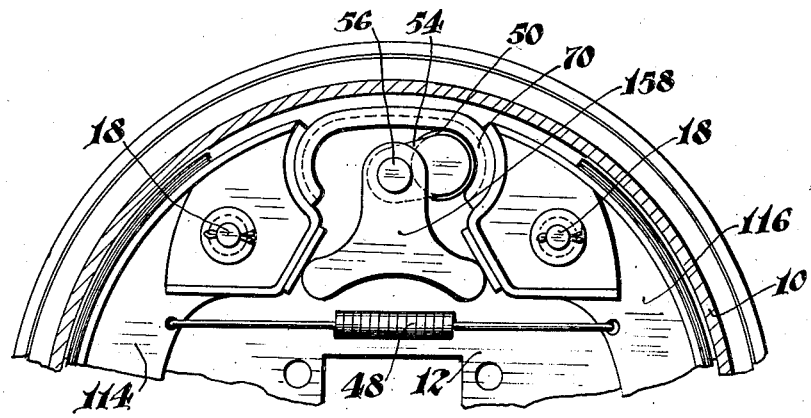
Figures 5 and 6 are respectively partial sections through brakes embodying other forms of the invention.

In the arrangement of Figure 5, shoes 114 and 116 are lifted by a freely floating pivoted wedge 158, while both shoes remain in engagement with a stamping 70 secured to the backing plate and curved at its ends to seat in sockets in the shoe ends, after which the shoes are spread apart to complete the application of the brake.

Figure 6:
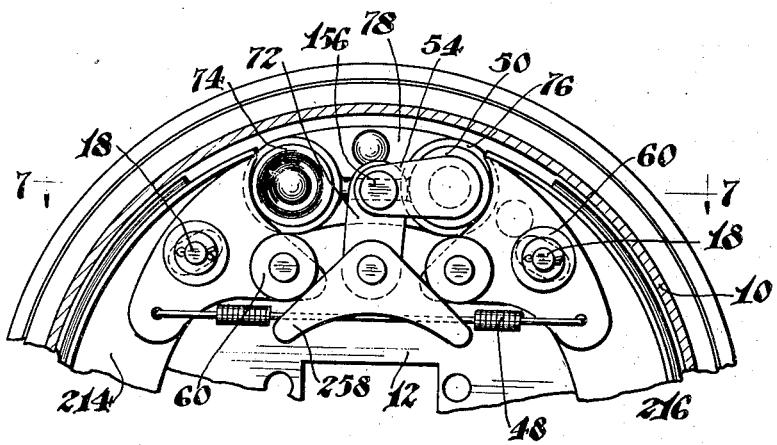
Figure 7:
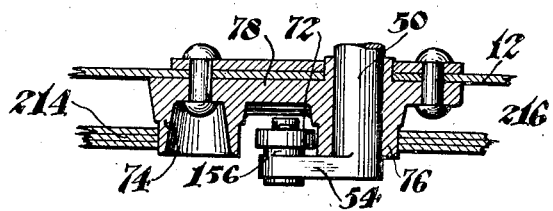
Figure 7 is a partial section through the applying means of Figure 6, on the line 7—7 of Figure 6.

The brake of Figures 6 and 7 differs from those described above in that the shoes 214 and 216 are first lifted and then spread apart by a wedge 258 connected by a link 72 to a pin 156 carried by the arm 54 of shaft 50. Shaft 50 in this case is journaled in one of two bosses 74 and 76 in a forged bracket 78 riveted to the backing plate, the bosses 74 and 76 also serving as anchors engaged by shoes 214 and 216.

While several illustrative embodiments are described herein in detail, it is not my intention to limit the scope of the invention to those particular embodiments, or otherwise than by the terms of the appended claims. It is not my intention to claim in the present application any subject-matter covered by my prior pending applications, particularly applications Nos. 261,068, 266,505, and 285,289.

I claim:

1. A brake comprising, in combination, a drum, a floating friction device having one part which anchors when the drum is turning in one direction and another part which anchors when the drum is turning in the other direction, and a floating wedge operable to shift said device against the drum while both of said parts remain anchored and then further operable to expand said device while the drum friction holds one or the other of said parts anchored.

2. A brake comprising, in combination, a drum, a floating friction device having one part which anchors when the drum is turning in one direction and another part which anchors when the drum is turning in the other direction, and applying means operable to shift said device against the drum while both of said parts remain anchored and then further operable to expand said device while the drum friction holds one or the other of said parts anchored, said parts being constructed and arranged to anchor on part of the applying means.

3. A brake comprising, in combination, a drum, applying means including an operating member movable generally radially of the drum, and friction means applied by the applying means and having one part which anchors on said movable member when the drum is turning in one direction and another part which anchors on said movable member when the drum is turning in the other direction.

4. A brake comprising, in combination, a drum, an operating member movable generally radially of the drum, friction means applied by the applying means and having one part which anchors on said movable member when the drum is turning in one direction and another part which anchors on said movable member when the drum is turning in the other direction, and an applying device for the friction means which is operated by the movable member.

5. A brake including friction means and an applying device, in combination with a bodily-movable part operating the applying device and serving as an anchorage for the friction means.

6. A brake including friction means and an applying device, in combination with a shaft having an eccentric pin operating the applying device and serving as an anchorage for the friction means.

7. A brake having, in combination, friction means having adjacent separable ends, a fixedly-mounted stamping between said ends and serving as an anchorage therefor, a shaft within said stamping, and a floating wedge engaging said ends and operated by said shaft.

8. A brake having, in combination, friction means having adjacent separable ends, a fixedly-mounted stamping between said ends and serving as an anchorage therefor, a shaft within said stamping having an operating arm, and a wedge engaging said ends and pivoted on said arm.

9. A brake comprising, in combination, friction means having adjacent separable ends, a fixed bracket having bosses against which said ends anchor, and a shaft journaled in one of said bosses and having a pivotally-mounted wedge engaging said ends.

In testimony whereof, I have hereunto signed my name.

LUDGER E. LA BRIE.

CERTIFICATE OF CORRECTION.

Patent No. 1,852,121.  April 5, 1932.

LUDGER E. LA BRIE.

It is hereby certified that error appears in the printed specification of the above numbered patent requiring correction as follows: Page 1, line 46, for "unchangeable" read interchangeable; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)